(12) United States Patent
Tseng et al.

(10) Patent No.: US 10,756,858 B2
(45) Date of Patent: Aug. 25, 2020

(54) CELL (RE)SELECTION AND UPLINK COMPONENT CARRIER SELECTION

(71) Applicant: FG Innovation Company Limited, Tuen Mun (CN)

(72) Inventors: Yung-Lan Tseng, Hsinchu (TW); Chie-Ming Chou, Hsinchu (TW); Hung-Chen Chen, Hsinchu (TW); Yu-Hsin Cheng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/250,184

(22) Filed: Jan. 17, 2019

(65) Prior Publication Data

US 2019/0222367 A1    Jul. 18, 2019

Related U.S. Application Data

(60) Provisional application No. 62/618,143, filed on Jan. 17, 2018.

(51) Int. Cl.
*H04L 5/00* (2006.01)
*H04W 36/08* (2009.01)
*H04W 48/20* (2009.01)
*H04W 72/04* (2009.01)
*H04W 36/00* (2009.01)

(52) U.S. Cl.
CPC ............ *H04L 5/001* (2013.01); *H04L 5/0098* (2013.01); *H04W 36/0069* (2018.08); *H04W 72/042* (2013.01); *H04W 72/048* (2013.01); *H04W 36/08* (2013.01); *H04W 48/20* (2013.01)

(58) Field of Classification Search
CPC ............. H04W 74/0833; H04W 80/02; H04W 72/0413; H04L 5/10
See application file for complete search history.

(56) References Cited

U.S. PATENT DOCUMENTS

| 2019/0150052 | A1* | 5/2019 | Wang | H04W 36/305 370/331 |
| 2019/0208548 | A1* | 7/2019 | Shih | H04W 72/0453 |
| 2020/0037345 | A1* | 1/2020 | Ryoo | H04W 76/10 |

* cited by examiner

*Primary Examiner* — Iqbal Zaidi
(74) *Attorney, Agent, or Firm* — ScienBiziP, P.C.

(57) ABSTRACT

A method for a user equipment (UE) is disclosed. The method includes determining, by the UE, whether to select a supplementary uplink (SUL) component carrier for building or resuming a radio resource control (RRC) connection with a serving cell during at least one of: a cell selection procedure, having a cell selection or reselection procedure; or a UL/SUL component carrier decision procedure, where the determination of whether to select the SUL component carrier is based at least in part on a mobility state of the UE.

13 Claims, 8 Drawing Sheets

FIG. 2

```
PRACH-ConfigInfo ::=         SEQUENCE {
    prach-ConfigIndex        INTEGER (0..63),
    highSpeedFlag            BOOLEAN,
    zeroCorrelationZoneConfig INTEGER (0..15),
    prach-FreqOffset         INTEGER (0..94)
}
```

```
SIB1 ::=         SEQUENCE {
    ......
    servingCellConfigCommon          ServingCellConfigCommonSIB
                                     OPTIONAL,    -- Need R
    ......
}

ServingCellConfigCommonSIB ::=   SEQUENCE {
    downlinkConfigCommon             DownlinkConfigCommonSIB,
    uplinkConfigCommon               UplinkConfigCommonSIB,
    supplementaryUplink              UplinkConfigCommonSIB
                                     OPTIONAL,    -- Need R
                                     OPTIONAL,    -- Need R
    ......
}
```

300

CELL (RE)SELECTION AND UPLINK COMPONENT CARRIER SELECTION

CROSS-REFERENCE TO RELATED APPLICATION(S)

The present application claims the benefit of and priority to a provisional U.S. Patent Application Ser. No. 62/618,143 filed on Jan. 17, 2018 entitled "Cell (re)selection & Uplink component carrier selection,". The disclosure is hereby incorporated fully by reference into the present application.

FIELD

The present disclosure generally relates to wireless communications, and more particularly, to using a supplementary uplink (SUL) component carrier for uplink communications.

BACKGROUND

The 3rd Generation Partnership Project (3GPP) has been discussing the use of a supplementary uplink in addition to a primary uplink in a cell to improve coverage and performance in uplink direction for the next generation (e.g., $5^{th}$ Generation New Radio (5G NR)) wireless communication networks.

However, there is a need in the art to provide specific implementation solutions to cell (re)selection and uplink carrier selection when SUL Component Carriers (CCs) are deployed in the next generation (e.g., 5G NR) wireless communication networks.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 2 is a diagram illustrating a HighSpeedFlag in a random access resource configuration of SIB 2 under LTE protocols.

FIG. 3 is a diagram illustrating supplementary uplink information in SIB 1, according to 3GPP Technical Specification 38.331.F.3.0.

SUMMARY

Figure 1:
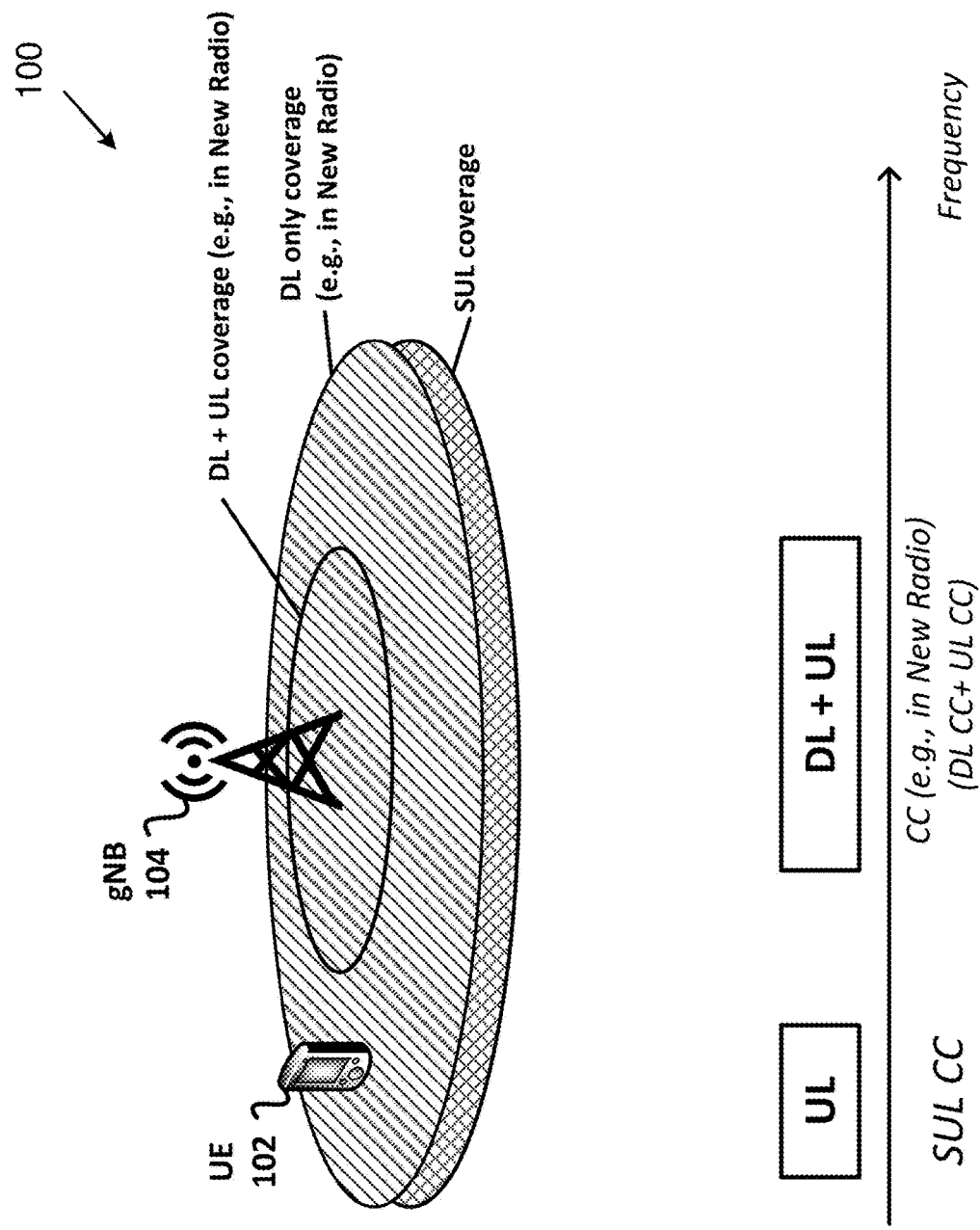
FIG. 1 is a diagram illustrating a cell with SUL CC deployment, according to an exemplary implementation of the present application.

The present disclosure is directed to cell (re)selection and uplink carrier selection when a supplementary uplink carrier is jointly considered with a primary uplink carrier in the next generation (e.g., 5G NR) wireless communication networks.

In a first aspect of the present application, a method for a user equipment (UE) is disclosed, the method comprising: determining, by the UE, whether to select a supplementary uplink (SUL) component carrier for building or resuming a radio resource control (RRC) connection with a serving cell during at least one of: a cell (re)selection procedure, having a cell selection or reselection procedure; or a UL/SUL component carrier decision procedure; wherein the determination of whether to select the SUL component carrier is based at least in part on a mobility state of the UE.

In an implementation of the first aspect, the cell (re) selection procedure further comprises: determining, by the UE, whether to trigger a SUL prioritization for the cell (re)selection procedure based on a service type of the UE; (re)selecting, by the UE, a serving cell based at least in part on the SUL prioritization when the SUL prioritization is triggered.

In another implementation of the first aspect, the SUL prioritization for the cell (re)selection procedure includes assigning cells supporting SUL component carriers (CCs) with higher priorities over cells not supporting SUL CCs.

In yet another implementation of the first aspect, the UE applies the SUL prioritization for the cell (re)selection procedure by modifying S-criteria based on the mobility state of the UE.

In yet another implementation of the first aspect, the—UE applies the SUL prioritization for the cell (re)selection procedure by modifying R-criteria based on the mobility state of the UE.

In yet another implementation of the first aspect, the SUL prioritization for the R-criteria includes assigning cells supporting SUL CCs with higher rankings over cells not supporting SUL CCs.

In yet another implementation of the first aspect, for the UL/SUL component carrier decision procedure, the UE decides to apply a UL CC or a SUL CC based on random access resource configurations on the uplink component carriers.

In yet another implementation of the first aspect, the UE receives configurations and parameters of a cell for SUL prioritization and the UL/SUL component carrier decision procedure through downlink control signaling, wherein the configurations and parameters differ with the mobility state of the UE.

In a second aspect of the present application, a user equipment (UE) is disclosed, the UE comprising: one or more non-transitory computer-readable media having computer-executable instructions embodied thereon; and at least one processor coupled to the one or more non-transitory computer-readable media, and configured to execute the computer-executable instructions to: determine whether to select a supplementary uplink (SUL) component carrier for building or resuming a radio resource control (RRC) connection with a serving cell during at least one of: a cell (re)selection procedure, having a cell selection or reselection procedure; or a UL/SUL component carrier decision procedure; wherein the determination of whether to select the SUL component carrier is based at least in part on a mobility state of the UE.

In an implementation of the second aspect, during the cell (re)selection procedure, the at least one processor is further configured to execute the computer-executable instructions to: determine whether to trigger a SUL prioritization for the cell (re)selection procedure based on a service type of the UE; (re)select a serving cell based at least in part on the SUL prioritization when the SUL prioritization is triggered.

In another implementation of the second aspect, the SUL prioritization for the cell (re)selection procedure includes assigning cells supporting SUL component carriers (CCs) with higher priorities over cells not supporting SUL CCs.

In yet another implementation of the second aspect, the at least one processor is further configured to execute the computer-executable instructions to: apply the SUL prioritization for the cell (re)selection procedure by modifying S-criteria based on the mobility state of the UE.

In yet another implementation of the second aspect, the at least one processor is further configured to execute the computer-executable instructions to: apply the SUL prioritization for the cell (re)selection procedure by modifying R-criteria based on the mobility state of the UE.

In yet another implementation of the second aspect, the SUL prioritization for the R-criteria includes assigning cells supporting SUL CCs with higher rankings over cells not supporting SUL CCs.

In yet another implementation of the second aspect, for the UL/SUL component carrier decision procedure, the UE decides to apply a UL CC or a SUL CC based on random access resource configurations on the uplink component carriers.

In yet another implementation of the second aspect, the at least one processor is further configured to execute the computer-executable instructions to: receive configurations and parameters of a cell for SUL prioritization and the UL/SUL component carrier decision procedure through downlink control signaling; wherein the configurations and parameters differ with the mobility state of the UE.

In a third aspect of the present application, a method for a base station is disclosed, the method comprising: providing, by the base station, whether a cell supports a supplementary uplink (SUL) component carrier through system information; providing, by the base station, control parameters of at least one of a SUL prioritization and a UL/SUL component carrier decision procedure to one or more user equipments (UEs) through broadcasting or dedicated signaling.

In a fourth aspect of the present application, a base station is disclosed, the base station comprising: one or more non-transitory computer-readable media having computer-executable instructions embodied thereon; and at least one processor coupled to the one or more non-transitory computer-readable media, and configured to execute the computer-executable instructions to: provide whether a cell supports a supplementary uplink (SUL) component carrier through system information; provide control parameters of a SUL prioritization and a UL/SUL component carrier decision procedure to one or more user equipments (UEs) through broadcasting or dedicated signaling.

DETAILED DESCRIPTION

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, a LTE-Advanced Pro system, or a 5G New Radio (NR) Radio Access Network) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services or V2X services.

In a next generation wireless communication network, a UE may be configured with two UL frequency carriers for one downlink carrier of the same cell, where one is a new radio uplink component carrier (NR-UL CC) (e.g., a primary uplink component carrier) and another one is a supplementary uplink carrier (SUL CC). For the convenience of description, UL CC is used in the present application to refer to an NR-UL CC (e.g., a primary UL CC). However, in some implementations, uplink packet delivery (e.g., uplink packet delivery through Physical Uplink Share Channel (PUSCH) transmissions) is implemented on only one of the UL and SUL CCs, and the UL/SUL component carrier decision is controlled by the serving cell(s). In contrast, one cell may support initial access on UL CC or SUL CC by configuring separated Random Access resource (RA resource) for the respective UL CC or SUL CC through control signalings (e.g., through broadcasting system information or dedicated RRC control signalings). However, the UE may select only one carrier (between UL CC and SUL CC) for initial access.

In a RAN (e.g., NR RAN or LTE RAN), there may be none, one, or up to two PRACH configuration(s) with corresponding RA resource & PRACH preamble sets in a cell. Moreover, in some implementations (e.g., LTE protocols), an evolved nodeB (eNB) (under LTE protocols) may indicate to an RRC idle UE to apply a Restricted set of random access (RA) resource or an Unrestricted set of RA resource by setting a HighSpeedFlag in the RA resource configuration of SIB 2 (System Information Block 2). As shown in diagram 200 of FIG. 2, a UE may apply a Restricted set (Type A) as one of the PRACH preamble set if the highSpeedFlag=true. Otherwise, the UE may apply an Unrestricted set if the highSpeedFlag=false. On the other hand, to a UE that supports mobility enhancements, the UE should apply Restricted set (type B) for random access procedure if Restricted set (type B) is configured as the PRACH preamble Set 2.

In the next generation (e.g., 5G NR) wireless networks, there is a need for a gNB to configure different PRACH configuration(s) for UL CCs and SUL CCs separately. Based on the NR protocols, each cell may indicate the types of PRACH preamble sets by providing an Information Element 'restrictedSetConfig', which indicates the PRACH preamble set is 'Unrestricted set', 'Restricted set (Type A)' or 'Restricted set (Type B)', in the RACH-Config of system information. Thus, different uplink (UL/SUL) component carrier selection rules need to be provided by different RA resource configurations in UL and/or SUL CCs. Various uplink (UL and/or SUL) component carrier selection rules are discussed in PART 3.

As shown in FIG. 1, gNB 104 may configure one or more SUL CCs to extend the UL coverage to the SUL coverage. With the support of the SUL CCs, located in lower frequency bands (in comparison of 5G NR high frequency bands), the UE's loading (e.g., loading on UL power consumption or modulation & coding scheme) in UL transmission can be relieved.

In FIG. 1, each cell which supports both an UL CC (e.g., a primary UL CC) and a SUL CC may configure a downlink (DL)-Reference Signal Received Power (RSRP) threshold, and each cell may broadcast the DL-RSRP threshold to the UE, for example, through system info oration. A UE in radio resource control (RRC) idle state (or RRC inactive state) may select a SUL CC for initial access or for camping, if the UE detects that the DL-RSRP value from the serving cell of the UE is below the DL-RSRP-threshold, which is broadcasted by the serving cell. Otherwise, the UE may select the UL CC for initial access with the serving cell. In implementation, the target reference signal types for measurement may be Synchronization Signals (e.g., primary synchronization signal/secondary synchronization signal) blocks in the synchronization signal block sets (SS Block sets), Demodulation Reference Signal (DMRS) in the Physical Broadcast Channel (PBCH), etc.

Also, because of the characteristics of the radio waves of the UL CCs (e.g., in high frequency bands, such as 3.5 GHz or above) and the SUL CCs (e.g., in low frequency bands, such as 700 MHz), the SUL CCs, in general, may provide a larger UL coverage to the UE than the UL CCs. For example, high mobility UEs may prefer SUL CCs over UL CCs because the SUL CCs may provide larger coverage areas than the UL CCs (e.g., primary UL CCs). Implementations of UE selection on UL CCs based on its mobility state will be discussed in the present application. Also, in some implementations, a gNB may configure one or more UEs to decide which UL CC(s) to be selected by jointly considering the DL-RSRP measurement results and the mobility state of the UEs.

In NR protocols, the mobility state may influence the cell (re)selection procedure in the formula of S-criteria. In some implementations, UEs may make cell selection parameter decisions based on their mobility state. An RRC idle UE may decide its own mobility state based on the number of cell reselections during a pre-defined time period (e.g., $T_{CRmax}$). As an example, under 3GPP TS 38.304.F.1.0, state detection criteria may include the following:

The UE mobility state is determined if the parameters ($T_{CRmax}$, $N_{CR\_H}$, $N_{CR\_M}$ and $T_{CRmaxHyst}$) are broadcasted in system information for the serving cell.

State Detection Criteria:
  Normal-Mobility State Criteria:
    If number of cell reselections during time period $T_{CRmax}$ is less than $N_{CR\_M}$.
  Medium-Mobility State Criteria:
    If number of cell reselections during time period $T_{CRmax}$ is greater than or equal to $N_{CR\_M}$ but less than $N_{CR\_H}$.
  High-Mobility State Criteria:
    If number of cell reselections during time period $T_{CRmax}$ is greater than $N_{CR\_H}$.
  The UE shall not consider consecutive reselections where a cell is reselected again right after one reselection for mobility state detection criteria.

State Transitions:
The UE shall:
  if the criteria for High-mobility state is detected:
    enter High-mobility state.
  else if the criteria for Medium-mobility state is detected:
    enter Medium-mobility state.
  else if criteria for either Medium- or High-mobility state is not detected during time period $T_{CRmaxHyst}$.
    enter Normal-mobility state.

In addition, by jointly referring to the decision rules in the LTE specification, 3GPP TS 36.304 provides the following:

(1) The UE shall not count consecutive reselections between same two cells into mobility state detection criteria if same cell is reselected just after one other reselection. Here, the value of $T_{CRmax}$, $N_{CR\_M}$, $N_{CR\_H}$, etc. are provided through broadcasting message (e.g., system information).
(2) The UE may consider itself at No mobility, Normal-mobility state, Medium-mobility state, and High-mobility state based on given rules. (3) Then, network may configure different scaling factors of different mobility states to the UE to do cell reselection based on the UE's mobility state and the corresponding scaling factors.

In addition, a UE may also decide its own mobility state based on the UE's moving history information.

The deployment of SUL CCs may have additional impacts on cell (re)selection and UL/SUL CC selection decision when initial access is supported in both of the uplink CCs. First, whether to deploy SUL CCs is decided by telecom operators. Thus, a UE may find out that, in its neighborhood, some gNBs are deployed with SUL CCs, while others are not. As such, at the cell (re)selection stage, it may be beneficial for the UE to select a serving cell by considering SUL CC deployment in certain conditions (e.g., when the UE needs a large uplink packet transmission to the NR network but only a small amount of DL control data reception (e.g., an uplink-dominant service)). In other implementations, SUL CCs may not be very critical to the UE, when the UE only requires DL packets, for example, during Multi-Cast Broadcast service (MBMS) (e.g., a downlink-dominant service).

Figure 4:
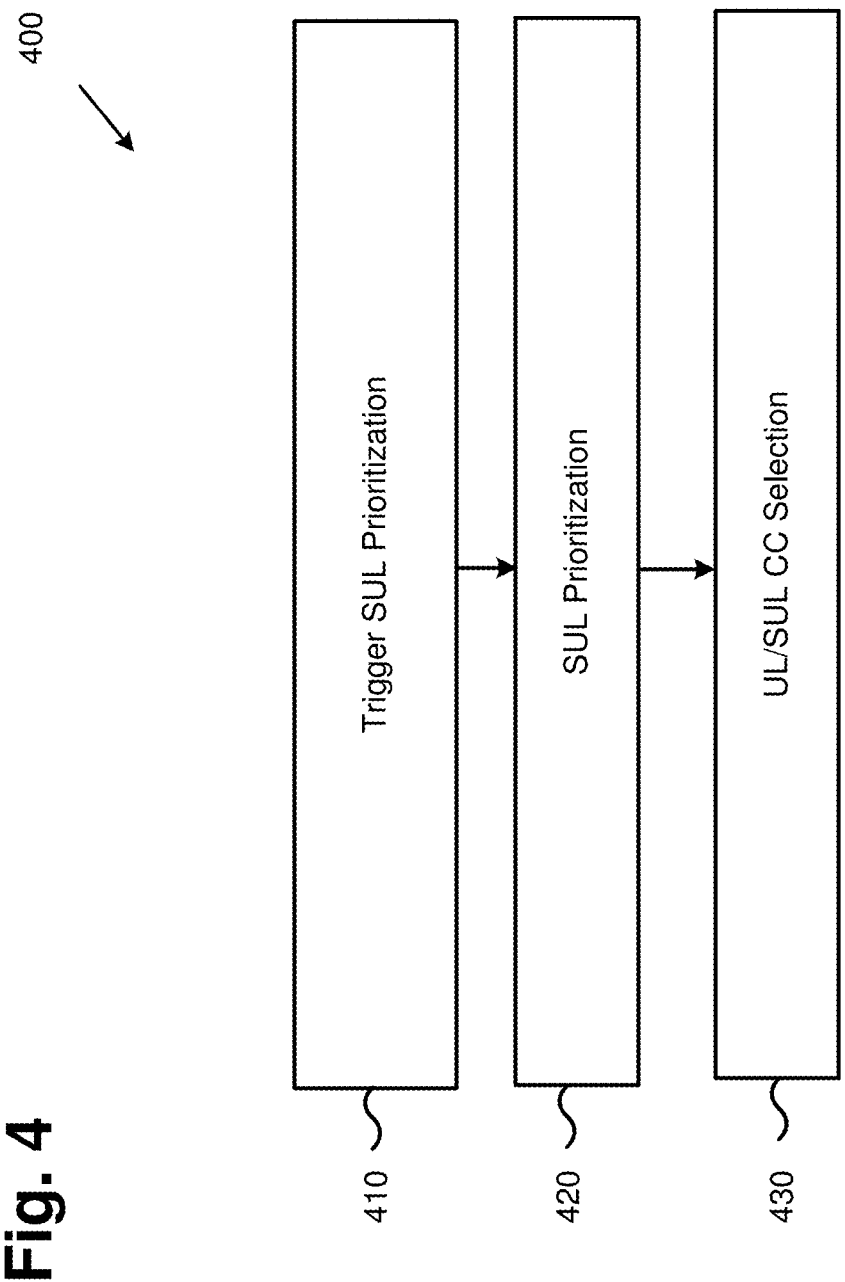
FIG. 4 is a flowchart showing SUL prioritization and UL/SUL CC selection, according to an exemplary implementation of the present application.

FIG. 4 is a flowchart showing triggering of SUL prioritization (action 410), SUL prioritization implementation (action 420), and UL/SUL CC selection (action 430), according to implementations of the present application. It should be noted that the SUL prioritization and UL/SUL CC selection may be implemented independently of each other. Various implementations of the present application focus on jointly considering UL and SUL CCs during cell (re)selection and uplink (UL/SUL) component carrier selection. In the first part (PART 1) of the present application, various triggering events of SUL prioritization are provided, where the triggering events may be considered by a UE for prioritizing SUL during the cell (re)selection procedures. In the second part (PART 2) of the present application, various implementations and/or solutions on how the SUL prioritization may be realized during the cell (re)selection procedure are provided. In the third part (PART 3) of the present application, various solutions on UL/SUL CC selection after the UE camps on a suitable cell are provided.

Part 1: Triggering Events for SUL Prioritization

In the following Embodiments 1-1, 1-2 and 1-3, various implementations are provided with regarding to when a UE may trigger the prioritization rules (also referred to as "SUL prioritization" in the present application) to prioritize cells with SUL CC(s) during cell (re)selection procedures.

Embodiment 1-1: Decision Based on UE Speed

In Embodiment 1-1, a UE may decide whether to prioritize cells supporting SUL CCs over cells not supporting SUL CCs based on the UE's moving speed. As shown in Table 1, the UE may map its own moving speed into several UE speed categories, including no mobility, low mobility, medium mobility, high mobility, for example. Then, based on the speed categories, different serving cell (re)selection rules (e.g., different S-criteria/R-criteria configurations for SUL CC prioritization) are provided to different UE speeds.

For example, a UE with high mobility may prioritize a cell supporting SUL over a cell not supporting SUL during cell (re)selection. In another example, a UE with no mobility, low mobility or medium mobility may not prioritize a cell supporting SUL over a cell not supporting SUL during cell (re)selection. For a UE which triggers SUL prioritization for cell (re)selection procedure, the UE may apply different rules (e.g., S-criteria/R-criteria formula, which favors Cells supporting SUL in comparison with prior S-criteria/R-criteria in LTE protocols, during the cell (re)selection procedure). The embodiments of SUL prioritization are provided in PART 2.

In some implementations, the UE may decide its own UE speed based on at least one of the following:
a) the number of cell reselection events during a given time span (e.g., as UE mobility state in LTE protocol);
b) Global Positioning System signal or other Radio Access Technology (e.g., Dedicated Short Range Communications (DSRC));
c) application level service; or
d) moving history information, such as the history of serving cell list. Tracking area update record, or handover record (when the UE just moves to RRC idle state/RRC Inactive state from RRC Connected state), RAN notification area update record (e.g., for the Cell (re)selection of UEs in RRC inactive state), etc.

TABLE 1

Tigger SUL CC Prioritization by Considering UE Speed

| UE Speed | Serving Cell (re)Selection Rules |
|---|---|
| No mobility | Not trigger SUL CC Prioritization |
| Low mobility | Not trigger SUL CC Prioritization |
| Medium mobility | Not trigger SUL CC Prioritization |
| High mobility | Trigger SUL CC Prioritization |

A UE may obtain the rules in Table 1 by: (a) receiving broadcasting message (e.g., through system information or system information on-demand procedure in NR protocols) from a RAN, (b) receiving dedicated signaling (e.g., RRC signalings, such as the last valid RRC Connection Release message when the RAN releases the RRC Connection with the UE), (c) a fixed rule in technical specifications, or (d) USIM (UMTS Subscriber Identity Module) or UE memory module.

In the following descriptions, the UE may decide whether to trigger SUL prioritization based on the service types which triggers an initial access to the RAN. In the present application, the service types may be provided based on: (1) RRC Establishment/Resume Cause (Embodiment 1-2); (2) NAS (Non-Access Stratum) signaling (Embodiment 1-3).

Embodiment 1-2: Decision Based on RRC Establishment/Resume Cause

When a UE attempts to initiate a transition to RRC connected state/mode by triggering an initial access, the UE may initiate data transfer for different RRC establishment causes, such as:
a) emergency;
b) highpriorityAccess;
c) mt (mobile terminating)-Access;
d) mo (mobile originating)-signalling;
e) mo (mobile originating)-data;
f) delayTolerantAccess;
g) mo-voiceCall.

In the present implementation, the UE may decide whether to prioritize cells with SUL CCs for cell (re) selection based on the establishment cause, which is delivered from the NAS (Non-Access Stratum) layer to the AS (Access Stratum) layer in the beginning of an RRC connection establishment. For example, in some implementations, a UE may decide to assign a cell supporting SUL a higher priority than a cell not supporting SUL when the establishment cause is mo-data or mo-signaling. In some implementations, a UE may not jointly consider SUL CC to other establishment causes. In some implementations, in addition to prioritizing cell(s) supporting SUL for cell (re)selection based on establishment cause, a UE may further clarify whether mo-data or mo-signaling is DL-dominant or UL-dominant. For a UL-dominant service, the UE may also decide to prioritize cells supporting SULs during cell (re) selection. Otherwise (e.g., DL-dominant traffic), the UE may not prioritize cells supporting SULs during cell (re)selection.

In some other embodiments, an RRC Inactive UE may also decide whether to trigger SUL prioritization based on an RRC Connection Resume Cause while the UE is preparing to implement an RRC Connection Resume procedure. For example, within the RRC Connection Resume Cause: {emergency, highPriorityAccess, mt-Access, mo-Signalling, mo-Data, mo-VoiceCall, mo-VideoCall, mo-SMS, ma-Update, mps-PriorityAccess, mcs-PriorityAccess}, a UE may decide to trigger SUL prioritization while the RRC Connection Resume Causes is ma-Update, highPriorityAccess, or emergency. On the other hand, the UE may not trigger SUL CC prioritization for the other RRC Connection Resume Causes. Also, it should be noted that, some of the RRC Connection Resume Causes may be generated directly by the AS (Access Stratum) layer instead of being propagated from the NAS (Non-Access Stratum) layer.

Embodiment 1-3: Decision Based on NAS Signaling

In Embodiment 1-3, a UE may judge or determine a traffic type based on network slice (e.g., network slice ID), which is delivered by the NAS layer on the UE side. In a 5G NR wireless network, the NAS layer on the UE side may instruct the AS layer to establish an RRC connection (or resume the RRC Connection) with a given network slice ID (e.g., by referring the Network Slice Selection Assistance Information) from the NAS layer. In one implementation, one network slice ID may correspond to one specific service in the UE's registered Public Land Mobile Network (PLMN) (e.g., Ultra Reliable Low Latency Communication service (URLLC), Closed-Circuit Television (CCTV), eMBB (enhanced mobile broadband) service, etc.). For certain types of services, such as CCTV image monitoring, a UE may need to transmit a large amount of data to the core network in the uplink direction. So, the UE may need SUL CC(s) to support such service which requires a large amount of uplink bandwidth. In one implementation, the NAS layer may instruct the UE (through NAS signaling) to assign a cell supporting SUL CC a higher priority than a cell not supporting SUL CC, when a network slice (e.g., CCTV image monitoring) with UL-dominant traffic is indicated in the NAS signaling. In another implementation, the AS layer on the UE side may be triggered to assign a cell supporting SUL a higher priority than a cell not supporting SUL, when the AS layer receives a specific network slice ID (e.g., CCTV service) for the cause of an RRC connection establishment.

In some implementations, the UE may build an RRC connection (or resume the RRC Connection) with a network slice ID, where the traffic type of the corresponding network slice is DL dominant. In such implementations, the AS layer may instruct the UE to select the serving cell based on DL signaling strength (e.g., based on S-criteria/R-criteria of LTE protocols). In addition, the UE may not assign a cell supporting SUL a higher priority than a cell not supporting SUL.

PART 2: Implementations of SUL Prioritization

Figure 5:
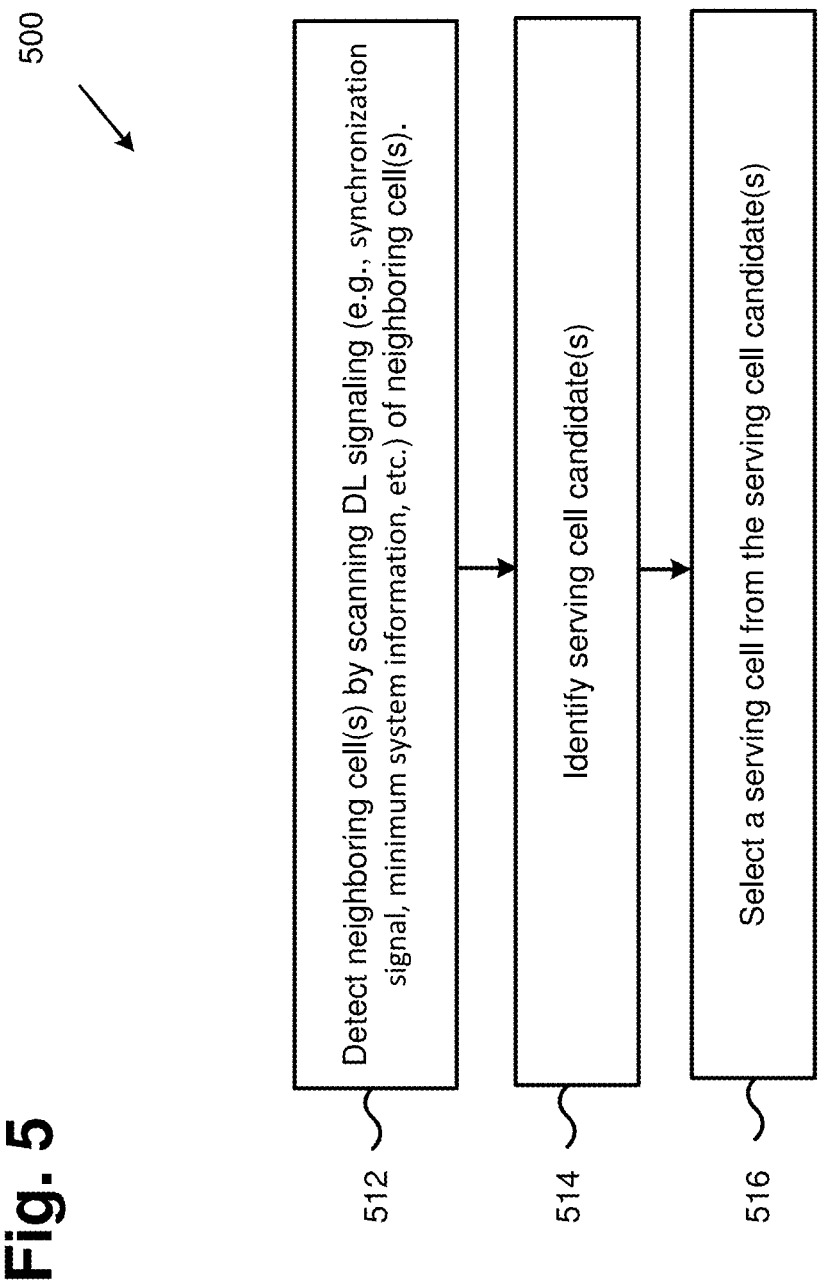
FIG. 5 is a flowchart showing a method for cell (re) selection, according to an exemplary implementation of the present application.

A UE may apply SUL prioritization during a cell (re) selection procedure (e.g., after the UE deciding to trigger SUL prioritization) based on the embodiments in PART 1. In PART 2, solutions about how SUL prioritization is realized during cell (re)selection procedures are provided. The progress of SUL prioritization may be presented by the flow chart for SUL prioritization as illustrated in FIG. 5.

In method 500, action 512 may include detecting neighboring cell(s). For example, in action 512, a UE may scan DL signaling of the neighboring cell(s). DL signaling may include synchronization signal block sets, minimum system information, system information, etc.

In one implementation of the present application, as shown in diagram 300 of FIG. 3, a base station (e.g., a gNB) may indicate whether a SUL CC is configured in at least one of its cells, for example, by broadcasting the SUL CC configuration in SIB 1. Thus, a cell may provide SUL CC configuration in SIB 1 if a SUL CC is deployed in the cell. When a UE receives the SIB 1(s) of one or more cells from the base station, the UE may observe whether SUL CC(s) is supported or not by the one or more cells of the base station. For example, during cell (re)selection, the UE may find out among the neighboring cells which ones are deployed with SUL CC(s) (also referred to in the present application as "cell(s) with SUL(s)" and/or "cell(s) supporting SUL(s)"), and which ones are not deployed with SUL CC (also referred to in the present application as "cell(s) without SUL(s)" and/or "cell(s) not supporting SUL(s)") by reading SIB 1.

In another implementation, a Supplementary Uplink Indicator, which indicates whether the cell itself supports SUL or not, may be included in minimum system information (be provided in the Remaining minimum System Information or Physical Broadcast Channel, or Physical Shared Channel), which is broadcasted by the neighboring cells themselves.

In another implementation, a cell may provide its neighboring cells' information in the other system information (other SI), which the Supplementary Uplink Indicators of the neighbor cells are also included in the other SI. As such, a UE may receive information regarding whether one or more of the neighboring cells support SUL or not by reading the other SI message provided by the UE's serving cell (e.g., through system information on demand). In some additional embodiments, a cell may provide its neighboring cells' information about SUL configuration in dedicated DL control signaling (e.g., in RRCConnectionReconfiguration or RRCConnectionRelease message) to the UE.

In method 500, action 514 may include serving cell candidates identification. For example, in action 514, the UE may identify at least one cell as a serving cell candidate. The serving cell candidates may need to fulfill one or more of the following requirements:

(1) the received DL signaling quality (e.g. RSRP, RSRQ, SINR, etc.) from the cell to the UE is higher than the corresponding DL-signaling-quality-threshold (the DL signaling quality may be RSRP, RSRQ, SINR, etc.). In some embodiments, the serving cell candidates are decided by S-criteria (e.g., Srxlev (Received Signal Strength)>0 AND Squal (Received Signal Quality)>0) of NR protocols.

(2) the cell is not barred to by the network (e.g., by referring to the cell barring bit in SIB 1).

Also, it should be noted that, in some implementations, the decision rules in Embodiment 1-1 through Embodiment 1-3 may be jointly considered with the DL-RSRP (Reference Symbol Received Power)-threshold. For example, a UE may be a fixed (no mobility) CCTV camera for transmitting 8K resolution (UL-dominant traffic) to an NR cell continuously. In addition, the NR cell is close to the UE and so the DL signal quality detected by the UE is higher than the DL-RSRP-threshold. By jointly considering the factors, such as mobility state, UL-dominant traffic, DL signal quality (e.g., the DL signal quality is higher than the given DL-RSRP-threshold), the UE may not prioritize cell(s) supporting SUL CC(s) during cell (re)selection.

In method 500, action 516 may include selecting a serving cell from the serving cell candidate(s). For example, in action 516, the UE may select a serving cell from the serving cell candidates obtained in action 514. In one implementation, the UE may select the serving cell by jointly considering SUL CC support.

Embodiment 2-1: S-Criteria Enhancements for SUL Prioritization

By referring to 3GPP Technical Specification 36.304, the original cell selection criteria (S-criteria), where SUL is not considered, obey the following rules:

S-Criteria:

A Cell is suitable to the UE when: Srxlev>0 AND Squal>0 where:

$$Srxlev = Q_{rxlevmeas} - (Q_{rxlevmin} + Q_{rxlevminoffset}) - Pcompensation - Qoffset_{temp} \quad \text{(S-a)}$$

$$Squal = Q_{qualmeas} - (Q_{qualmin} + Q_{qualminoffset}) - Qoffset_{temp} \quad \text{(S-b)}$$

The definition of each parameters in the S-criteria is summarized in Table 2 (also by referring to 3GPP Technical Specification 36.304, which is incorporated by reference in its entirety to the present application).

TABLE 2

| | Parameters for S-Criteria (3GPP TS 36.304) |
|---|---|
| Srxlev | Cell selection RX level value (dB) |
| Squal | Cell selection quality value (dB) |
| $Qoffset_{temp}$ | Offset temporarily applied to a cell as specified in TS 36.331 (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |

TABLE 2-continued

Parameters for S-Criteria (3GPP TS 36.304)

| | |
|---|---|
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | If the UE supports the additionalPmax in the NS-PmaxList, if present, in SIB1, SIB3 and SIB5:<br>$\max(P_{EMAX1} - P_{PowerClass}, 0) - (\min(P_{EMAX2}, P_{PowerClass}) - \min(P_{EMAX1}, P_{PowerClass}))$ (dB);<br>else:<br>$\max(P_{EMAX1} - P_{PowerClass}, 0)$ (dB) |
| $P_{EMAX1}$, $P_{EMAX2}$ | Maximum TX power level an UE may use when transmitting on the uplink in the cell (dBm) defined as $P_{EMAX}$ in TS 36.101. $P_{EMAX1}$ and $P_{EMAX2}$ are obtained from the p-Max and the NS-PmaxList respectively in SIB1, SIB3 and SIB5 as specified in TS 36.331. |
| $P_{PowerClass}$ | Maximum RF output power of the UE (dBm) according to the UE power class as defined in TS 36.101 |

S-Criteria Enhancements:

To support SUL prioritization, an enhancement of S-criteria is provided in the present disclosure as two possible functions for a UE to prioritize a cell supporting SUL:

S-Criteria for SUL Prioritization (to Prioritize Cells with SUL):

Equation #1: a compensation value, $P_{compensation\_SUL}$, is added in the calculation of Srxlev_SUL:

$$\text{Srxlev\_SUL} = Q_{rxlevmeas} - (Q_{rxlevmin} + Q_{rxlevminoffset}) - \text{Pcompensation} - Q\text{offset}_{temp} + P_{compensation\_SUL} \quad \text{(SS-a)}$$

Equation #2: an offset value, $Q\text{offset}_{SUL}$, is added in the calculation of Squal_SUL:

$$\text{Squal\_SUL} = Q_{qualmeas} - (Q_{qualmin\_min} + Q_{qualminoffset}) - Q\text{offset}_{temp} + Q\text{offset}_{SUL} \quad \text{(SS-b)}$$

In one implementation, to prioritize cell(s) supporting SUL during cell (re)selection, the compensation value is greater than 0 ($P_{compensation\_SUL} > 0$) and the offset value is greater than 0 ($Q\text{offset}_{SUL} > 0$) to a cell with SUL. On the other hand, the compensation value and the offset value may be both 0 ($P_{compensation\_SUL} = Q\text{offset}_{SUL} = 0$) to a cell without SUL. The UE may select the serving cell by calculating the {Srxlev_SUL, Squal_SUL} of each detected cell. The values of {$P_{compensation\_SUL}$, $Q\text{offset}_{SUL}$} may be broadcasted by the cells (e.g., through system information), or by dedicated signaling (e.g., by the last valid RRC Connection Release message when the RAN instructs the UE to move to RRC idle/inactive state), or by technical specifications, or by UE stored information. In addition, in some implementations, different {$P_{compensation\_SUL}$, $Q\text{offset}_{SUL}$} values may be applied to different cases. For example, a UE in high or medium speed may apply S-criteria for SUL prioritization based on different {$P_{compensation\_SUL}$, $Q\text{offset}_{SUL}$} values, as shown in Table 3 below. Moreover, it should be noted that Table 3 may also be part of Embodiment 1-1.

TABLE 3

Serving Cell Selection Rules by Jointly Considering UE Speed

| UE speed | Serving Cell Selection Rules |
|---|---|
| No mobility | No SUL prioritization; $P_{compensation\_SUL}$ = $Q\text{offset}_{SUL}$ = 0 |
| Low mobility | No SUL prioritization; $P_{compensation\_SUL}$ = $Q\text{offset}_{SUL}$ = 0 |
| Medium mobility | SUL prioritization with {$P_{compensation\_SUL\_med}$, $Q\text{offset}_{SUL\_med}$} |

TABLE 3-continued

Serving Cell Selection Rules by Jointly Considering UE Speed

| UE speed | Serving Cell Selection Rules |
|---|---|
| High mobility | SUL prioritization with {$P_{compensation\_SUL\_high}$, $Q\text{offset}_{SUL\_high}$} |

The parameters in Table 3 may also be broadcasted by the cells (e.g., through system information) or by dedicated signaling (e.g., by the last valid RRC Connection Release message when the RAN instructs the UE to move to RRC idle/inactive state) or by technical specifications, or by UE stored information.

Also, in some embodiments, the offset value designs may be realized by configuring different $Q_{rxlevmin\_SUL}$ and/or $Q_{qualmin\_SUL}$ values for SUL prioritization based on UE mobility condition. For example, the following rules in Table 4(a) may be configured to the UE:

TABLE 4(a)

Serving Cell Selection Rules by Jointly Considering UE Speed

| UE speed | Serving Cell Selection Rules |
|---|---|
| No mobility | No SUL prioritization; $Q_{rxlevmin\_SUL} = Q_{qualmin\_SUL} = 0$ |
| Low mobility | No SUL prioritization; $Q_{rxlevmin\_SUL} = Q_{qualmin\_SUL} = 0$ |
| Medium mobility | SUL prioritization with {$Q_{rxlevmin\_SUL\_med}$, $Q_{qualmin\_SUL\_med}$} |
| High mobility | SUL prioritization with {$Q_{rxlevmin\_SUL\_high}$, $Q_{qualmin\_SUL\_high}$} |

The parameters in Table 4(a) may be broadcasted by cells (e.g., through system information) or by dedicated signaling (e.g., by the last valid RRC Connection Release message when the RAN instructs the UE to move to RRC idle/inactive state) or by technical specifications, or by UE stored information. Also, it should be noted that the same approach in Table 4(a) may also be applicable to the configuration of $Q_{qualmin\_min}$.

In some other embodiments, the $Q_{rxlevmin\_SUL}$ values for different UE speed may be realized by another approach. As shown in Table 4(b), one fixed $Q_{rxlevmin\_SUL}$ value may be configured to the UE with different scaling factors, which varies with different UE speed. So, sf-Med and sf-High, where both sf-Med and sf-High may be positive values, may also be provided to UEs to calculate different offset values for the S-criteria by multiplying the $Q_{rxlevmin\_SUL}$ with different scaling factors. The UE may decide which scaling factor to apply based on the estimated UE speed. Here, the parameters in Table 4(b) may also be broadcasted by the cells (e.g., through system information) or by dedicated signaling (e.g., by the last valid RRC Connection Release message when the RAN instructs the UE to move to RRC idle/inactive state) or by technical specifications, or by UE stored information. Also, the values of {Qrxlevmin_SUL_med, Qrxlevmin_SUL_high} in Table 4(b) may be represented by (mW) instead of dBm. It should be noted that the same approach in Table 4(b) may also be applicable to the configuration of $Q_{qualmin\_min}$.

TABLE 4(b)

Serving Cell Selection Rules by Jointly Considering UE Speed

| UE speed | Serving Cell Selection Rules with fixed $Q_{rxlevmin\_SUL}$ |
|---|---|
| No mobility | No SUL prioritization; $Q_{rxlevmin\_SUL} = Q_{qualmin\_SUL} = 0$ |
| Low mobility | No SUL prioritization; $Q_{rxlevmin\_SUL} = Q_{qualmin\_SUL} = 0$ |
| Medium mobility | SUL prioritization with sf-Med; $Q_{rxlevmin\_SUL\_med} = Q_{rxlevmin\_SUL} *$ sf-Med |
| High mobility | SUL prioritization with sf-High $Q_{rxlevmin\_SUL\_high} = Q_{rxlevmin\_SUL} *$ sf-High |

It should be also noted that the S-criteria for SUL prioritization may be applied to cell selection and/or cell reselection procedure.

Embodiment 2-2: R-Criteria Enhancements for SUL Prioritization

In addition, after cell selection by applying the S-criteria, the UE may perform the rest part of cell reselection by implementing R-criteria, where the R-criteria for cell reselection are defined by referring to 3GPP TS 36.304:

R-Criteria:

$$R_s \text{(for serving Cell)} = Q_{meas,s} + Q_{Hyst} \quad \text{(R-1)}$$

$$R_n \text{(for neighbor Cell)} = Q_{meas,s} - Q_{offset} \quad \text{(R-2)}$$

TABLE 5

Parameters for R Criteria (3GPP TS 36.304)

| | |
|---|---|
| $Q_{meas}$ | RSRP measurement quantity used in cell reselections. $Q_{meas,s}$ is the RSRP measurement quality of serving cell; $Q_{meas,n}$ is the RSRP measurement quality of neighbor cell. |
| Qoffset | For intra-frequency: Equals to $Qoffset_{s,n}$, if $Qoffset_{s,n}$ is valid, otherwise this equals to zero. For inter-frequency: Except for NB-IoT, equals to $Qoffset_{s,n}$ plus $Qoffset_{frequency}$, if $Qoffset_{s,n}$ is valid, otherwise this equals to $Qoffset_{frequency}$. For NB-IoT equals to $QoffsetDedicated_{frequency}$ for any frequency other than the frequency of the dedicated frequency offset, if $QoffsetDedicated_{frequency}$ is valid, otherwise this equals to $Qoffset_{frequency}$ (if $QoffsetDedicated_{frequency}$ is valid $Qoffset_{frequency}$ is not used). |

For cell reselection, the UE may rank the $R_s$ and $R_n$ of the neighboring cells.

In the present implementation, the R criteria are considered for SUL prioritization (to prioritize cells supporting SUL):

$$R_s \text{(for serving Cell)} = Q_{meas,s} + Q_{Hyst} \quad \text{(RS-1)}$$

$$R_n \text{(for neighboring Cell without SUL)} = Q_{meas,s} - Q_{offset} - Q_{offset\_non\_SUL}. \quad \text{(RS-2)}$$

$$R_n \text{(for neighboring Cell with SUL)} = Q_{meas,s} - Q_{offset} + Q_{offset\_SUL}. \quad \text{(RS-3)}$$

Based on the example of R criteria for SUL prioritization in (RS-1), (RS-2), and (RS-3), the calculation of $R_s$ is the same with the R criteria. However, different $R_n$ calculations are provided for neighboring cells without SUL (e.g., in Equation RS-2) and/or neighboring cells with SUL (e.g., in Equation RS-3), respectively. In Equation RS-2, $Q_{offset\_non\_SUL} \geq 0$ is added to deprioritize the neighboring cells not deployed with SUL CC(s). In comparison, $Q_{offset\_SUL} \geq 0$ is also added in Equation RS-3 to prioritize the neighboring cells with SUL CC(s). In one implementation, parameters of {$Q_{offset\_non\_SUL}$} are provided in Table 6. In Table 6, the values of {$Q_{offset\_non\_SUL}$, $Q_{offset\_SUL}$} are decided by the cell type (e.g., cell w/wo SUL CC) of the serving cell during cell reselection. In some embodiments, the same {$Q_{offset\_non\_SUL\_S}$, $Q_{offset\_SUL\_S}$} design may also be applied to the calculation of $R_s$ based on the cell type of the serving cell (e.g., serving cell w/wo SUL CC).

$$R_s \text{(for serving Cell without SUL)} = Q_{meas,s} + Q_{Hyst} - Q_{offset\_non\_SUL\_S} \quad \text{(RS-4)}$$

$$R_s \text{(for serving Cell with SUL)} = Q_{meas,s} + Q_{Hyst} + Q_{offset\_SUL\_S}. \quad \text{(RS-5)}$$

{$Q_{offset\_non\_SUL}$, $Q_{offset\_SUL}$} (and {$Q_{offset\_non\_SUL\_S}$, $Q_{offset\_SUL\_S}$}) may be broadcasted by the cells (e.g. through system information or system information on-demand procedure in NR protocols), or by dedicated signaling (e.g., by the last valid RRC Connection Release message when the RAN instructs the UE to move to RRC idle/inactive state), or a fixed value defined in technical specification, or a value stored by the UE (e.g., USIM).

TABLE 6

Parameters for R-Criteria for SUL Prioritization

| Scenario | Offset parameters design for R criteria for SUL prioritization |
|---|---|
| Serving Cell is a Cell without SUL | $Q_{offset\_non\_SUL} = 0$ $Q_{offset\_SUL} > 0$ |
| Serving Cell is a Cell with SUL | $Q_{offset\_non\_SUL} \geq 0$ $Q_{offset\_SUL} > 0$ |

For SUL prioritization, a UE may apply the R-criteria for SUL prioritization with $Q_{offset\_SUL} > 0$ and $Q_{offset\_non\_SUL} \geq 0$ to a neighbor cell which supports SUL. Otherwise, the UE may perform cell reselection by setting $Q_{offset\_SUL} = Q_{offset\_SUL} = Q_{offset\_non\_SUL} = 0$, if the UE decides not to apply SUL prioritization.

It should be noted that the UE may apply different {$Q_{offset\_non\_SUL}$, $Q_{offset\_SUL}$} values for cell reselection. In addition, the UE may apply different {$Q_{offset\_non\_SUL}$, $Q_{offset\_SUL}$} values under different conditions, such as UE speed. As shown in Table 7, when SUL prioritization is to be applied, a UE with medium mobility may apply {$Q_{offset\_non\_SUL\_med}$, $Q_{offset\_SUL\_med}$} for cell reselection. In another example, a UE with high mobility may decide to apply {$Q_{offset\_non\_SUL\_high}$, $Q_{offset\_SUL\_high}$} for cell reselection. The values in Table 7 may be broadcasted by the cells (e.g., through system information or through system information on-demand procedure in the NR protocols), or by dedicated signaling (e.g., by RRCConnectionRelease message when the RAN instructs the UE to move to RRC idle/inactive state), or a fixed value defined in technical specification, or a value stored in USIM of the UE.

TABLE 7

Serving Cell Reselection Rules by Jointly Considering UE Speed.

| UE Speed | Serving Cell (re)Selection Rules |
|---|---|
| No mobility | No SUL prioritization; $Q_{offset\_non\_SUL} = Q_{offset\_non\_SUL} = 0$ |
| Low mobility | No SUL prioritization; $Q_{offset\_non\_SUL} = Q_{offset\_non\_SUL} = 0$ |
| Medium mobility | SUL prioritization with $\{Q_{offset\_non\_SUL\_med}, Q_{offset\_SUL\_med}\}$ |
| High mobility | SUL prioritization with $\{Q_{offset\_non\_SUL\_high}, Q_{offset\_SUL\_high}\}$ |

Embodiment 2-3: Direct Prioritization

In Embodiment 2-3, a UE may directly give a high priority to cells supporting SUL CC(s) (in comparison with cells that do not support SUL) during the cell (re)selection procedures. As shown in diagram 600 of FIG. 6, the UE may decide the candidates of serving cells, which is also called serving cell candidates in the present application, by referring to the given DL-signaling-quality-threshold (e.g., DL-RSRP-threshold, DL-RSRQ (Reference Signal Received Quality)-threshold, or DL-SINR (Signal to Interference and Noise Ratio) threshold). In some embodiments, the serving cell candidates are decided by S-criteria (e.g., Srxlev (Received Signal Strength)>0 and Squal (Received Signal Quality)>0).

Figure 6:
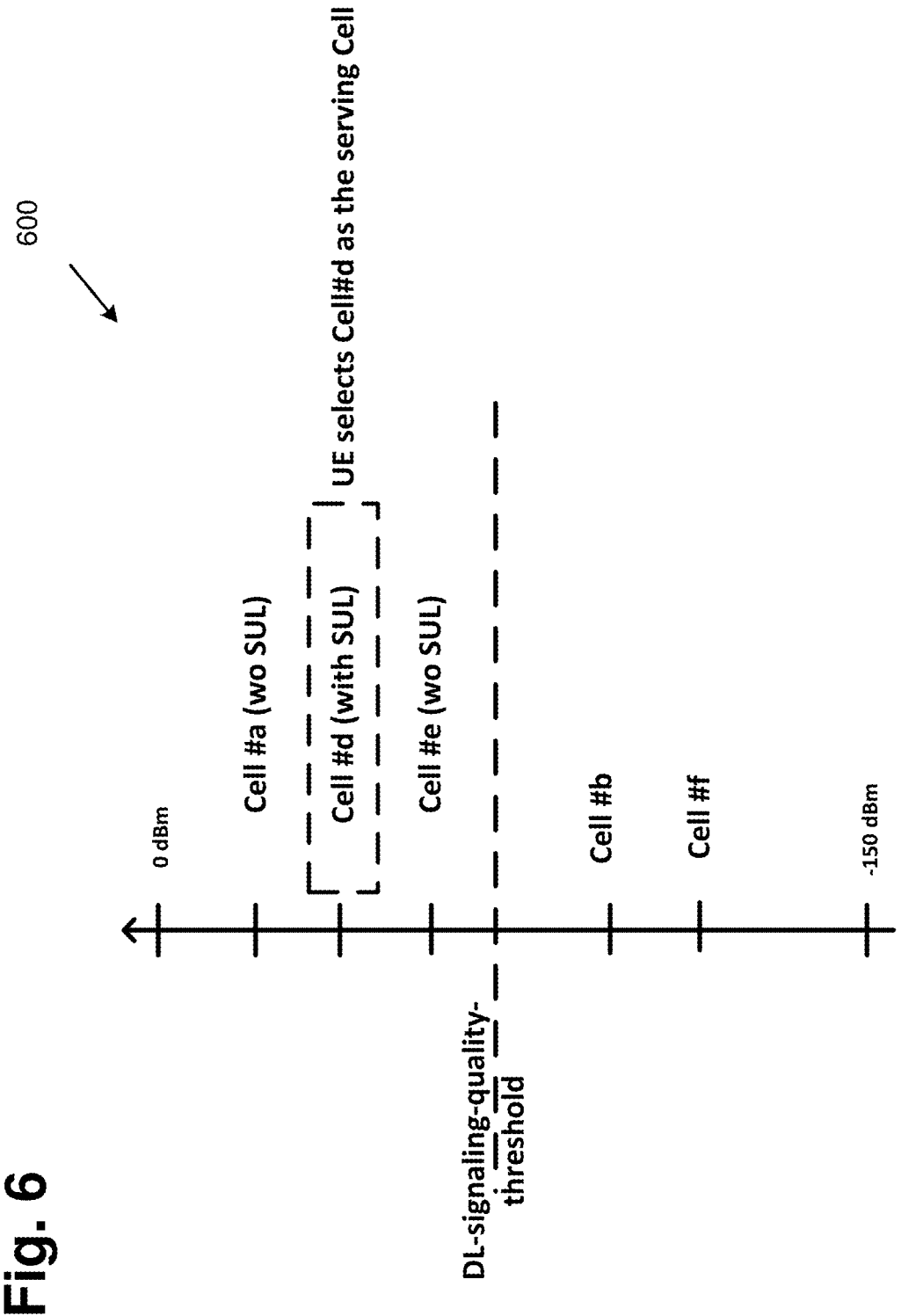
FIG. 6 is a diagram illustrating a serving cell (re)selection procedure by jointly considering DL-signaling strength and SUL CC deployment, according to an exemplary implementation of the present application.

As shown in FIG. 6, a UE may detect Cell # a through Cell # e in the neighborhood and the corresponding measured DL-RSRP values of each cell are also shown in FIG. 6 from the highest measured DL-RSRP value (e.g., Cell # a) to the lowest measured DL-RSRP value (e.g., Cell # c). In addition, the UE may identify the serving cell candidates, which includes {Cell # a, Cell # d, Cell # e}, because the received DL-RSRP values of these cells are higher than a given DL-signaling-quality-threshold. In some implementations, the value of DL-signaling-quality-threshold may be provided by the RAN through a broadcasting message (e.g., system information or system information on demand procedure in NR protocols) or by dedicated signaling (e.g., RRC signalings, such as by the last valid RRC Release message when the RAN releases the RRC connection with the UE). In some other implementations, the DL-signaling-quality-threshold may be pre-defined in USIM or the UE's memory module. Based on the direct prioritization rules, the cells supporting SUL would always get higher priority than cells which do not support SUL. Thus, in FIG. 6, the UE may select Cell # d as the serving cell because only Cell # d is deployed with SUL CC among all the identified serving cell candidates {Cell # a, Cell # d, Cell # e}. In some implementations, there may be more than one cell that fulfills the DL-signaling-quality-threshold requirement and support SUL CC. In such a case, the UE may select the cell with the highest DL-RSRP measurement result (e.g., the cell with the highest $R_n$ value). For example, in FIG. 6, if both Cell # a and Cell # d support SUL CC, the UE may select Cell # a as the serving cell since Cell # a has the highest DL-RSRP measurement result.

It should be noted that, various implementations under PART 1 and PART 2 can be applied to both Standalone (SA) and part of Non-Standalone (NSA) Radio Access Network Deployment in a cellular network deployment:

1) For an SA deployment, a UE may select suitable NR cells based on the proposed rules in PART 1 and PART 2.

2) For an NSA deployment, the various implementations/rules may be applied to NE-DC (e.g., an NR Cell is the master node and an E-UTRAN Cell is the secondary Cell) and NR-DC (e.g., both the master node and secondary node are NR Cells). The UE may also need to find suitable NR cells first in NE-DC (e.g., the master cell group (MCG) is composed by NR cell(s) and the secondary cell group (SCG) is composed by E-UTRAN cells) or NR-DC (e.g., both the master cell group (MCG) and the secondary cell group (SCG) are composed by NR cells) deployments while the UE is in RRC inactive state, and the dual-connectivity configuration (e.g., NE-DC configuration or NR-DC configuration) is stored as part of the UE context.

PART 3: UL/SUL Carrier Selection

In PART 3, various embodiments, on whether a UE should select a UL or SUL CC for initial access after the cell (re)selection procedure while the serving cell supports both SUL CC and UL CC, are provided. It is worthy to note that SUL prioritization may or may not be applied jointly with the UL/SUL component carrier selection while the UE is selecting a serving cell during a cell (re)selection procedure.

Embodiment 3-1: SUL Prioritization

It should be noted that, for cell (re)selection, a UE may directly select a SUL CC as the uplink CC for initial access after the SUL prioritization is triggered. Therefore, the UE may select the SUL CC directly by referring to RRC Connection/Resume Cause, NAS signaling, or UE mobility state. More embodiments of UL/SUL component carrier selection by referring to UE mobility state are provided in Embodiment 3-2.

Embodiment 3-2: UE Mobility State

In Embodiment 3-2, a UE may select UL CC(s) or SUL CC(s) based on the UE's mobility condition (e.g., mobility state). Implementations in Embodiment 3-2 focus on the mapping of UL/SUL CC(s) and the UE's mobility condition. In various implementations of Embodiment 3-2, the effects of RA resource configuration may be neglected. For example, a gNB may configure Unrestricted sets on both of the SUL CC and UL CC.

Implementations provide different approaches for a UE to select a UL CC based on UE's mobility condition.

CASE 3-2-A: Direct Mapping Table

In CASE 3-2-A, a gNB may provide a mapping table of UE mobility state and UL CC (e.g., through system information) for UL CC selection. An example of a direct mapping table is shown as Table 8.

TABLE 8

Uplink Component Carrier Decision Rules based on UE Mobility State

| Mobility State | UL CC Selection |
|---|---|
| No-mobility | N.A. |
| Low-mobility | N.A. |
| Medium-mobility | SUL CC |
| High-mobility | SUL CC |

It is worthy to note that Table 8 may cause UEs in no-mobility or low mobility state to choose a UL CC even when they are on the cell edge of an NR cell if the UL CC is configured in the mapping table directly. Therefore, in Table 8, the UL CC selection may not be configured directly. That is, the UE may need to jointly consider the UE's mobility state with other factors in the UL/SUL carrier selection procedure.

CASE 3-2-B: UL CC Selection by Jointly Considering UE Mobility State and DL-RSRP Measurement Result CASE 3-2-B is provided to select an appropriate UL/SUL CC by jointly considering the UE mobility state and DL-RSRP measurement results. The Uplink component carrier decision rules are provided in Table 8.

First, a UE may measure the DL-RSRP value, $M_{rsrp}$ (e.g., by measuring the DL reference signals). The network may provide the DL-RSRP threshold set for SUL: {SUL-RSRP-threshold-no, SUL-RSRP-threshold-low, SUL-RSRP-threshold-med, SUL-RSRP-threshold-high} through broadcasting message (e.g., SIB 1) for the uplink component carrier decision rules. In some implementations, the DL-RSRP threshold set for SUL may be provided through dedicated signaling (e.g., RRC signaling, such as the last valid RRC Connection Release message received by UE), or be a set of fixed values in technical specifications, or be a set of values stored in USIM. After receiving UL CC decision rules, a UE may decide which UL CC for initial access by jointly considering the $M_{rsrp}$ and UE's mobility state, as shown in Table 9.

TABLE 9

Network Pre-Configured Rules for Operating UL CC based on UE's Mobility State & DL-RSRP Measurement Result

| Mobility State | UL CC Selection Rules |
| --- | --- |
| No-mobility | If $M_{rsrp}$ > SUL-RSRP-threshold-no => select UL CC Otherwise, =>select SUL CC |
| Low-mobility | If $M_{rsrp}$ > SUL-RSRP-threshold-low => select UL CC Otherwise, =>select SUL CC |
| Medium-mobility | If $M_{rsrp}$ > SUL-RSRP-threshold-med => select UL CC Otherwise, =>select SUL CC |
| High-mobility | If $M_{rsrp}$ > SUL-RSRP-threshold-high => select UL CC Otherwise, =>select SUL CC |

In CASE 3-2-B, a UE may first decide its own mobility state (e.g., based on the number of cell selections during a time period or history record). Then, the UE may also measure the DL-RSRP result. So, the UE may decide to apply SUL CC or UL CC based on the given rules in Table 9.

In some implementations, the network may provide different values for {SUL-RSRP-threshold-no, SUL-RSRP-threshold-low, SUL-RSRP-threshold-med, SUL-RSRP-threshold-high}. Since the UE with higher mobility may be more necessary to apply SUL CC for initial access, the network may configure the value based on the following rules:

SUL-RSRP-threshold-high=−60 dBm>SUL-RSRP-threshold-med=−70 dBm

>SUL-RSRP-threshold-low=−80 dBm>SUL-RSRP-threshold-no=−90 dBm.

In some other implementations, some values in the DL-RSRP threshold set for SUL may be set to a very high value (e.g., infinite or 0 dBm in RSRP) or a very low value (e.g., −150 dBm or negative infinite) since the range or RSRP measurement result is normally between 0 dBm~−200 dBm.

Example

{SUL-RSRP-threshold-no=−70 dBm;
  SUL-RSRP-threshold-low=−70 dBm;
  SUL-RSRP-threshold-med=−70 dBm,
  SUL-RSRP-threshold-high=infinite/0 dBm}.

In the example above, a UE in high mobility state may apply SUL CC directly (e.g., without considering other factors and/or parameters). In contrast, the UE in other mobility states may apply SUL CC if the measured DL-RSRP value is lower than −70 dBm or UL CC, if the measured DL-RSRP value is higher than −70 dBm.

In some other implementations, the {SUL-RSRP-threshold-no, SUL-RSRP-threshold-low, SUL-RSRP-threshold-med, SUL-RSRP-threshold-high} for different mobility states are provided by speed dependent scaling factors. As shown in Table 10, the speed dependent scaling factors $\{A_{rsrp\_n\_mobility}, A_{rsrp\_low\_mobility}, A_{rsrp\_med\_mobility}, A_{rsrp\_high\_mobility}\}$ and one DL-RSRP-threshold for UL CC selection are provided to the UEs (e.g., through broadcasting). Then, the UEs may apply different speed dependent scaling factors based on UE mobility state to obtain the SUL-RSRP-threshold (SUL-RSRP-threshold-no, SUL-RSRP-threshold-low, SUL-RSRP-threshold-med, SUL-RSRP-threshold-high). Also, the SUL-RSRP-thresholds in Table 10 may be represented by (mW) instead of dBm.

TABLE 10

Speed Dependent Scaling Factor for SUL-RSRP-Threshold Calculation in Different Mobility State

| Speed Dependent Scaling Factor | SUL-RSRP-Threshold Calculation |
| --- | --- |
| $A_{rsrp\_n\_mobility}$ | SUL-RSRP-threshold-no = DL-RSRP-threshold (mW)* $A_{rsrp\_n\_mobility}$ |
| $A_{rsrp\_low\_mobility}$ | SUL-RSRP-threshold-low = DL-RSRP-threshold (mW)* $A_{rsrp\_low\_mobility}$ |
| $A_{rsrp\_med\_mobility}$ | SUL-RSRP-threshold-med = DL-RSRP-threshold (mW)* $A_{rsrp\_med\_mobility}$ |
| $A_{rsrp\_high\_mobility}$ | SUL-RSRP-threshold-high = DL-RSRP-threshold (mW)* $A_{rsrp\_high\_mobility}$ |

It should be noted that, in some implementations, there may be less than four scaling factors and so the speed dependent scaling factors of some mobility state may be the same. For example, $A_{rsrp\_n\_mobility}=A_{rsp\_low\_mobility}$ and $A_{rsrp\_med\_mobility}=A_{rsrp\_high\_mobility}$. In other implementations, it may be $A_{rsrp\_high\_mobility} > A_{rsrp\_n\_mobility}=A_{rsrp\_low\_mobility}=A_{rsrp\_med\_mobility}\geq 0$.

Embodiment 3-3: RA Resource(s)

In an LTE wireless communication network, an eNB may, in the system information, indicate Restricted set (Type A) or Unrestricted set in the random access resource (RA resource) by using an indicator, such as a highSpeedFlag. In addition, one additional Unrestricted set (Type B) may also be configured to the UE to support UE high speed scenario.

As the next generation (e.g., 5G NR) wireless communication networks are designed to support UEs with much higher mobility than LTE, restriction on RA resource sets may be beneficial to the 5G NR networks as well as the UEs.

According to implementations of the present application, for SUL CCs and UL CCs, a base station (e.g., a gNB) may provide different RA resource configurations to SUL CCs and UL CCs. In Embodiment 3-3, a UE may decide a UL component carrier (SUL CC or UL CC) by jointly considering RA resource configuration and the UE's speed (e.g., high speed UE/non-high-speed UE). In some other embodiments, the UEs that support mobility enhancements (e.g., mobility enhancement designs in LTE protocols) may be categorized as high speed UEs, and the UEs that do not support mobility enhancements may be categorized as non-high-speed UEs. In addition, in such case, the high speed UEs may apply Restricted set for random access directly. In contrast, the non-high-speed UEs may implement random access only by Unrestricted set.

CASE 3-3-A: Up to One RA Resource Set in One UL CC

In CASE 3-3-A, a base station (e.g., a gNB) may allocate up to one RA resource configuration (e.g., RA resource set) in each UL CC. Thus, to one UL CC, there may be one of the following conditions: (1) No RA resource set, (2) RA Restricted set (TypeA or TypeB) only, (3) RA Unrestricted set only.

Figure 7:
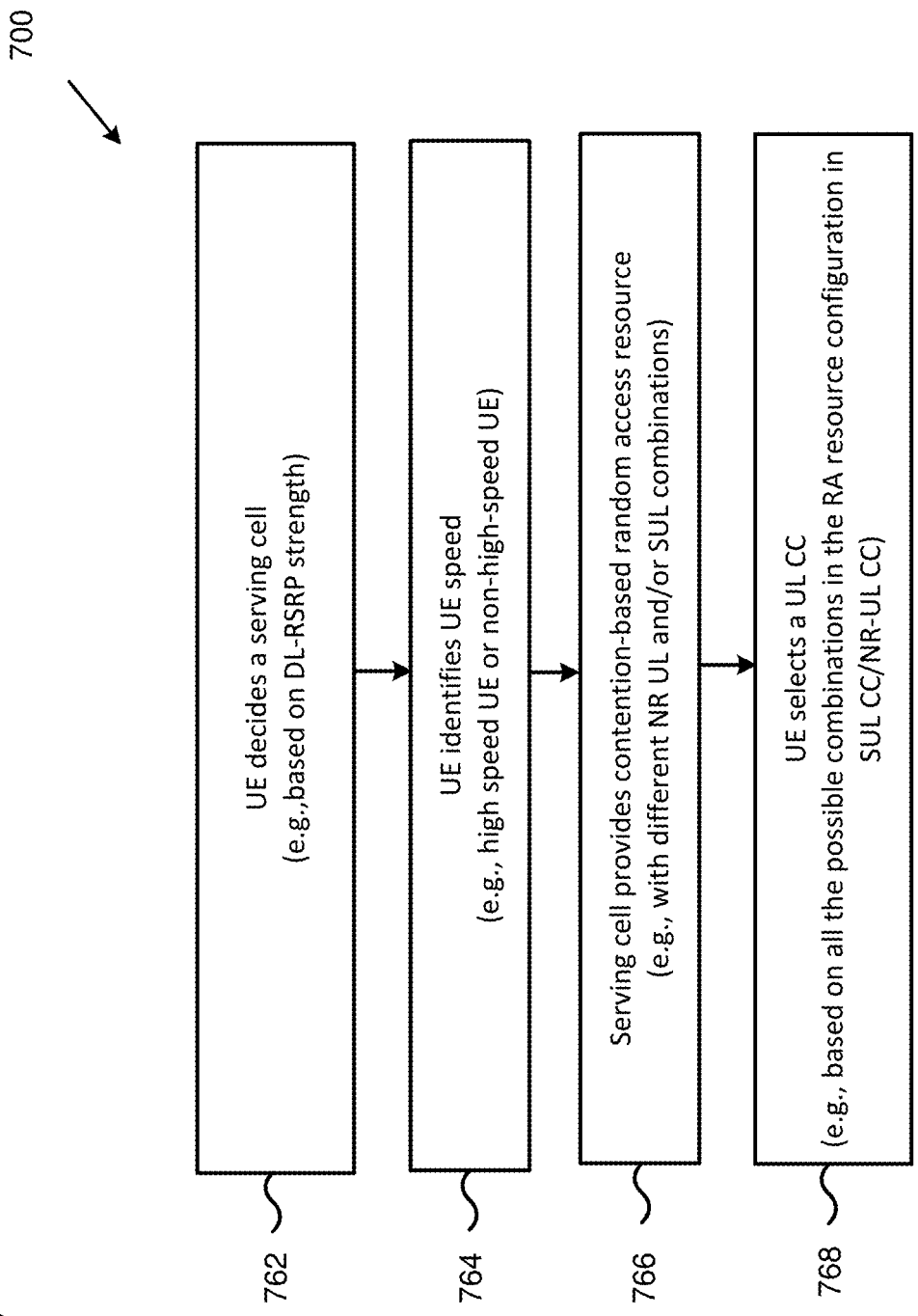
FIG. 7 is a flowchart showing a method for UL CC (re)selection, according to an exemplary implementation of the present application.

FIG. 7 shows a flowchart of a method for UL CC (re)selection, according to an implementation of the present application.

In action 762, a UE may decide a serving cell, for example, based on DL-RSRP strength.

In action 764, the UE may identify it is a high speed UE or a non-high-speed UE. In some implementations, the UE may make the decision based on received GPS record, based on the number of cell reselection during a pre-defined time span (e.g., mobility state in LTE protocol, such as high mobility state is mapped to high speed UE and other mobility state is mapped to non-high-speed UE), from NAS layer indication, or through the help of other RATs (e.g., Wi-Fi, DSRC, etc.), or based on the UE's moving history record.

In action 766, the serving cell may provide contention-based random access resource with different possible combinations, as shown in Table 11-1.

In action 768, the UE selects a UL CC based on all the possible combinations in the RA resource configuration in a UL/SUL CC. For example, the uplink CC selection rules for an RRC idle UE are summarized in Table 11-1.

TABLE 11-1

Uplink CC Selection Rules

| RA Resource No Configuration | UE Behavior |
|---|---|
| 1 UL (CC): N.A. SUL (CC): N.A. | This may happen to an NR Cell which only supports NSA operation. So, no RA resource would be provided in system information. Not considered in the present application |
| 2 UL: N.A. SUL: Unrestricted set | UE only selects SUL; UE could only apply Unrestricted set |
| 3 UL: N.A. SUL: Restricted set | UE only selects SUL; UE could only apply Restricted set |
| 4 UL: Unrestricted set SUL: N.A. | UE only selects UL; UE could only apply Unrestricted set |
| 5 UL: Restricted set SUL: N.A. | UE only selects UL; UE could only apply Restricted set |
| 6 UL: Unrestricted set SUL: Restricted set | (1) High speed UE should select SUL (& Restricted set) since Restricted set is configured only in SUL. (2) Non-high-speed UE would select UL (& Unrestricted set) since Unrestricted set is configured only in UL. |

TABLE 11-1-continued

Uplink CC Selection Rules

| RA Resource No Configuration | UE Behavior |
|---|---|
| 7 UL: Restricted set SUL: Unrestricted set | (1) High speed UE should select UL (& Restricted set) for random access, since Restricted set is configured only in UL. (2) Non-high-speed UE may select SUL (& Unrestricted set) since Unrestricted set is configured only in SUL. |
| 8 UL: Restricted set SUL: Restricted set | UE may select the uplink carrier based on other mechanisms (e.g., DL-RSRP-threshold) |
| 9 UL: Unrestricted set SUL: Unrestricted set | UE may select the uplink carrier based on other mechanisms (e.g., DL-RSRP-threshold) |

CASE 3-3-B: Up to Two RA Resource Sets in One UL CC

In CASE 3-3-B, a base station (e.g., a gNB) may allocate up to two resource sets (e.g., a restricted RA resource set and an unrestricted RA resource set) to one UL CC.

An RA resource configuration may include (1) N.A., (2) RA Restricted sets only, (3) RA Unrestricted sets only, or (4) one RA Restricted set and one RA Unrestricted set, to one UL CC. Thus, a UE may need to jointly consider Table 11-1 and Table 11-2 for UL/SUL CC selection. It is noted that a RA Restricted set may be Type A or Type B RA Restricted set.

TABLE 11-2

Uplink CC Selection Rules
(when each UL CC may be configured for up to 2 resource sets)

| RA Resource No. Configuration | UE Behavior |
|---|---|
| 1 UL: N.A. SUL: Unrestricted set & Restricted set | UE only selects SUL; (1) High speed UE may apply Restricted set. (2) Non-high-speed UE may apply Unrestricted set |
| 2 UL: Unrestricted set & Restricted set SUL: N.A. | UE only selects UL (3) High speed UE may apply Restricted set. (4) Non-high-speed UE may apply Unrestricted set |
| 3 UL: Unrestricted set SUL: Restricted set & Unrestricted set | (1) High speed UE may select SUL (& Restricted set) since Restricted set is configured only in SUL. (2) Non-high-speed UE may select the uplink carrier based on other mechanisms (e.g., DL-RSRP threshold) |
| 4 UL: Restricted set SUL: Restricted set & Unrestricted set | (1) High-speed UE may select the uplink carrier based on other mechanisms (e.g., DL-RSRP-threshold) (2) Non-high-speed UE may select SUL (& Unrestricted set) since Unrestricted set is configured only in SUL. |
| 5 UL: Restricted set & Unrestricted set SUL: Unrestricted set | (1) High speed UE may select UL (& Restricted set) for random access, since Restricted set is configured only in UL. (2) Non-high-speed UE may select the uplink carrier based on other mechanisms (e.g., DL-RSRP-threshold) |
| 6 UL: Restricted set & Unrestricted set SUL: Restricted set | (1) High speed UE may select the uplink carrier based on other mechanisms (e.g., DL-RSRP-threshold) (2) Non-high-speed UE should select UL (& Unrestricted set) for random access, since Unrestricted set is configured only in UL. |
| 7 SUL: Restricted set & Unrestricted set NR | (1) Step 1: UE may select the uplink carrier based on other mechanisms (e.g., DL-RSRP threshold) |

TABLE 11-2-continued

Uplink CC Selection Rules
(when each UL CC may be configured for up to 2 resource sets)

| RA Resource No. Configuration | UE Behavior |
|---|---|
| UL: Restricted set & Unrestricted set | (2) After Step 1, high speed UE would apply Restricted set in the selected UL carrier; Non-high-speed UE would apply Unrestricted set in the selected UL carrier. |

The PART 1 through PART 3 provided in the present application may be applied to RRC inactive UEs to decide the UL component carrier for RRC Connection Resume procedure. For example, the network may include the rules in the RRC messages (e.g., RRC Connection Release message) when the network instructs the UE to move to RRC inactive state. RRC inactive UEs may also obtain broadcasting message (e.g., system information) to obtain the parameters, resource, and mechanisms provided in PART 1 through PART 3.

It should be noted that to an RRC connected UE, a gNB may provide the serving cell decision/SUL prioritization and/or SUL/UL CC selection rules through dedicated signaling (e.g., RRC Connection Release message) when the network instructs the UE to move to RRC idle state.

Figure 8:
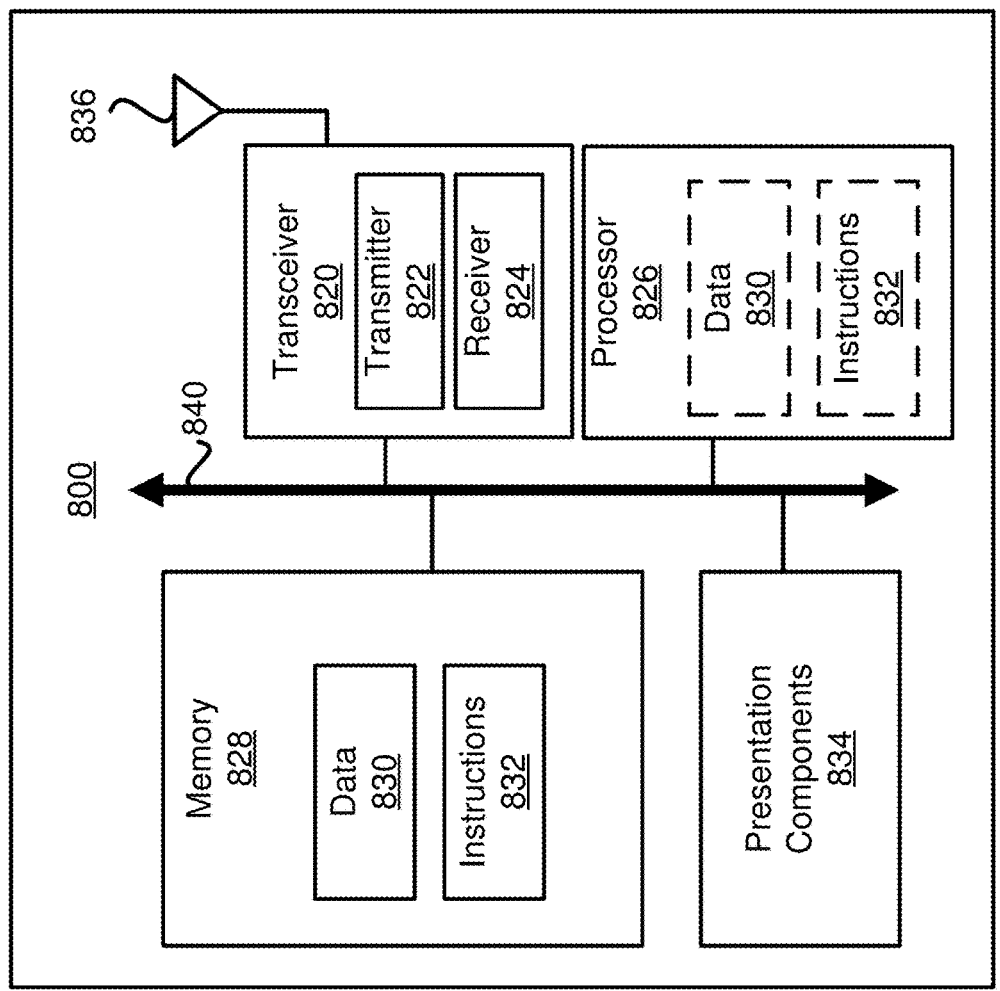
FIG. 8 illustrates a block diagram of a node for wireless communication, in accordance with various aspects of the present application.

FIG. 8 illustrates a block diagram of a node for wireless communication, in accordance with various aspects of the present application. As shown in FIG. 8, node 800 may include transceiver 820, processor 826, memory 828, one or more presentation components 834, and at least one antenna 836. Node 800 may also include a Radio Frequency (RF) spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit in different types of subframes and slots including, but not limited to, usable, non-usable and flexibly usable subframes and slot formats. Transceiver 820 may be configured to receive data and control channels.

Node 800 may include a variety of computer-readable media. Computer-readable media can be any available media that can be accessed by node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 828 may include computer-storage media in the form of volatile and/or non-volatile memory. Memory 828 may be removable, non-removable, or a combination thereof. Exemplary memory includes solid-state memory, hard drives, optical-disc drives, and etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1 through 7. Alternatively, instructions 832 may not be directly executable by processor 826 but be configured to cause node 800 (e.g., when compiled and executed) to perform various functions described herein.

Processor 826 may include an intelligent hardware device, e.g., a central processing unit (CPU), a microcontroller, an ASIC, and etc. Processor 826 may include memory. Processor 826 may process data 830 and instructions 832 received from memory 828, and information through transceiver 820, the base band communications module, and/or the network communications module. Processor 826 may also process information to be sent to transceiver 820 for transmission through antenna 836, to the network communications module for transmission to a core network.

One or more presentation components 834 presents data indications to a person or other device. Exemplary one or more presentation components 834 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a user equipment (UE), the method comprising:

determining whether to select a supplementary uplink (SUL) component carrier for building or resuming a radio resource control (RRC) connection with a serving cell during at least one of:

a cell (re)selection procedure, having a cell selection or reselection procedure;

and
a UL/SUL component carrier decision procedure;
wherein the determination of whether to select the SUL component carrier is based at least in part on a mobility state of the UE;
wherein the cell (re)selection procedure further comprises:
determining whether to trigger a SUL prioritization for the cell (re)selection procedure based on a service type of the UE;
(re)selecting a serving cell based at least in part on the SUL prioritization when the SUL prioritization is triggered;
wherein the SUL prioritization for the cell (re)selection procedure comprises assigning cells supporting SUL component carriers (CCs) with higher priorities over cells not supporting SUL CCs.

2. The method of claim 1, further comprising:
applying the SUL prioritization for the cell (re)selection procedure by modifying S-criteria based on the mobility state of the UE.

3. The method of claim 1, further comprising:
applying the SUL prioritization for the cell (re)selection procedure by modifying R-criteria based on the mobility state of the UE.

4. The method of claim 3, wherein applying the SUL prioritization for the R-criteria comprises assigning cells supporting SUL CCs with higher rankings over cells not supporting SUL CCs.

5. The method of claim 1, wherein, for the UL/SUL component carrier decision procedure, the UE decides to apply a UL CC or a SUL CC based on random access resource configurations on the uplink component carriers.

6. The method of claim 1, wherein the UE receives configurations and parameters of a cell for SUL prioritization and the UL/SUL component carrier decision procedure through downlink control signaling, wherein the configurations and parameters differ with the mobility state of the UE.

7. A user equipment (UE) comprising:
one or more non-transitory computer-readable media having computer-executable instructions embodied thereon; and
at least one processor coupled to the one or more non-transitory computer-readable media, and configured to execute the computer-executable instructions to:
determine whether to select a supplementary uplink (SUL) component carrier for building or resuming a radio resource control (RRC) connection with a serving cell during at least one of:
a cell (re)selection procedure, having a cell selection or reselection procedure; and
a UL/SUL component carrier decision procedure;
wherein the determination of whether to select the SUL component carrier is based at least in part on a mobility state of the UE;
wherein the cell (re)selection procedure further comprises:
determining whether to trigger a SUL prioritization for the cell (re)selection procedure based on a service type of the UE; and
(re)selecting a serving cell based at least in part on the SUL prioritization when the SUL prioritization is triggered;
wherein the SUL prioritization for the cell (re)selection procedure comprises assigning cells supporting SUL component carriers (CCs) with higher priorities over cells not supporting SUL CCs.

8. The UE of claim 7, wherein the at least one processor is further configured to execute the computer-executable instructions to:
apply the SUL prioritization for the cell (re)selection procedure by modifying S-criteria based on the mobility state of the UE.

9. The UE of claim 7, wherein the at least one processor is further configured to execute the computer-executable instructions to:
apply the SUL prioritization for the cell (re)selection procedure by modifying R-criteria based on the mobility state of the UE.

10. The UE of claim 9, wherein applying the SUL prioritization for the R-criteria comprises assigning cells supporting SUL CCs with higher rankings over cells not supporting SUL CCs.

11. The UE of claim 7, wherein, for the UL/SUL component carrier decision procedure, the UE decides to apply a UL CC or a SUL CC based on random access resource configurations on the uplink component carriers.

12. The UE of claim 7, wherein the at least one processor is further configured to execute the computer-executable instructions to:
receive configurations and parameters of a cell for SUL prioritization and the UL/SUL component carrier decision procedure through downlink control signaling;
wherein the configurations and parameters differ with the mobility state of the UE.

13. A method performed by a base station, the method comprising:
providing an indication to at least one user equipment of whether a cell supports a supplementary uplink (SUL) component carrier through system information;
providing control parameters of at least one of a SUL prioritization and a UL/SUL component carrier decision procedure to the at least one UE through broadcasting or dedicated signaling;
wherein the indication is provided during at least one of:
a cell selection or reselection procedure; and
a UL/SUL component carrier decision procedure;
wherein the selection or reselection procedure comprises:
determining, by the at least one UE, whether to trigger a SUL prioritization based on a service type of the at least one UE; and
selecting or reselecting, by the at least one UE, a serving cell based at least in part on the SUL prioritization when the SUL prioritization is triggered;
wherein the SUL prioritization comprises assigning cells supporting SUL component carriers (CCs) with higher priorities over cells not supporting SUL CCs.

* * * * *